No. 656,909. Patented Aug. 28, 1900.
L. J. TAYLOR.
KITCHEN UTENSIL.
(Application filed Dec. 22, 1899.)
(No Model.)
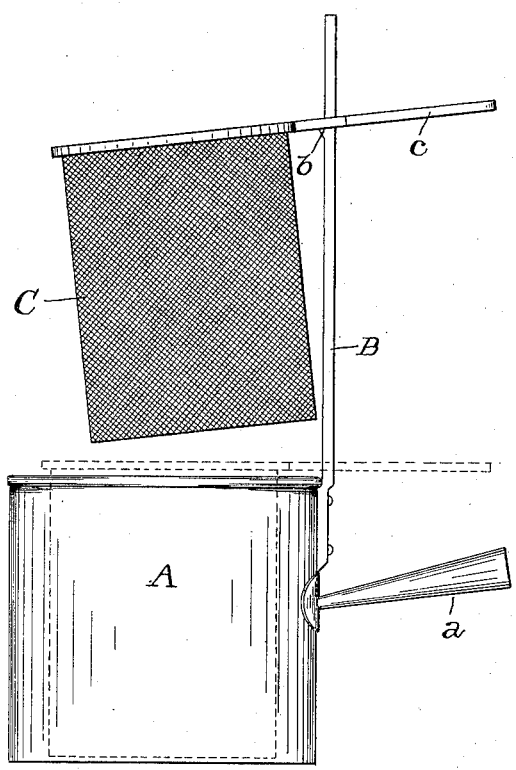
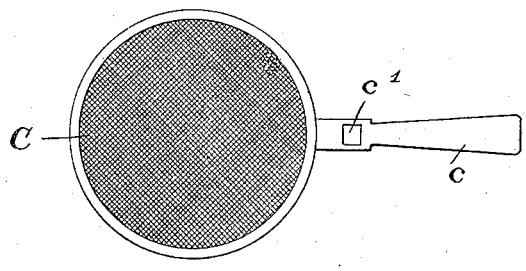

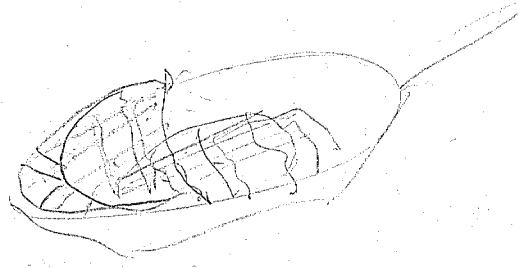

UNITED STATES PATENT OFFICE.

LAUREN J. TAYLOR, OF BALTIMORE, MARYLAND.

KITCHEN UTENSIL.

SPECIFICATION forming part of Letters Patent No. 656,909, dated August 28, 1900.

Application filed December 22, 1899. Serial No. 741,231. (No model.)

*To all whom it may concern:*

Be it known that I, LAUREN J. TAYLOR, a citizen of the United States, residing at Baltimore, in the State of Maryland, have invented certain new and useful Improvements in Kitchen Utensils, of which the following is a specification.

My invention relates to improvements in kitchen utensils for frying oysters.

When oysters are fried, it is necessary to immerse a colander or basket containing them into a receptacle filled with heated lard, and after the oysters have been cooked the basket is lifted out of the lard and held above the receptacle, so that the oysters may be drained. I have provided a device for this purpose, so that when the oysters have been fried the basket containing them may be removed from the lard and suspended above the receptacle on an upright standard, so as to permit the lard to be drained from them while the attention of the person attending to the cooking is directed otherwise.

In the accompanying drawings, Figure 1 is an elevation of my device, showing the basket suspended on the standard. Fig. 2 is a top plan view of the basket, showing the slot in the handle.

A designates a suitable receptacle for holding hot lard in which oysters are to be fried. This receptacle is provided with a handle $a$. Attached to the wall of the receptacle on the same side with the handle is a standard B, having a lip $b$, projecting on the side directly over the said receptacle.

C designates a basket or colander for holding the oysters and is smaller diametrically than the lard-receptacle A. This basket is provided with a handle $c$, rigidly attached to and projecting from the side of the basket, and the handle has a slot $c'$ to take over the standard B and large enough to pass the lip $b$, so as to permit the basket to be fully lowered and immersed into the hot lard contained in the receptacle A, so that the oysters may be fried. This position of the basket is shown by broken lines in Fig. 1. When the oysters are sufficiently cooked, the basket is to be lifted out of the hot lard, the slotted handle sliding upward on the standard until it passes the lip $b$, whereupon the basket and handle are to be tilted, as in Fig. 1, so that one of the upper sides of the slot and one of the lower sides of the said slot will bear against the standard on opposite sides while the handle will rest on the lip, and thus suspend the basket, as shown, while the attention of the person attending to the cooking is directed otherwise. When the oysters are drained, the basket may be lifted up off the standard and the oysters removed.

Having thus described my invention, what I claim as new, and desire to secure by Letters Patent, is—

A kitchen utensil for frying oysters, comprising a receptacle for holding hot lard and which is provided with a standard having a lip projecting on its side over the receptacle, and a basket or colander adapted to be placed in said receptacle, said basket having a handle projecting from its side and which is provided with a slot to take over and slide up and down on the standard and pass the lip and which when the basket is above the lip and tilted will rest on the said lip and allow the basket to be suspended over the receptacle.

In testimony whereof I affix my signature in the presence of two witnesses.

LAUREN J. TAYLOR.

Witnesses:
F. W. BARNACLO,
CHARLES VIETSCH.